UNITED STATES PATENT OFFICE 2,143,222

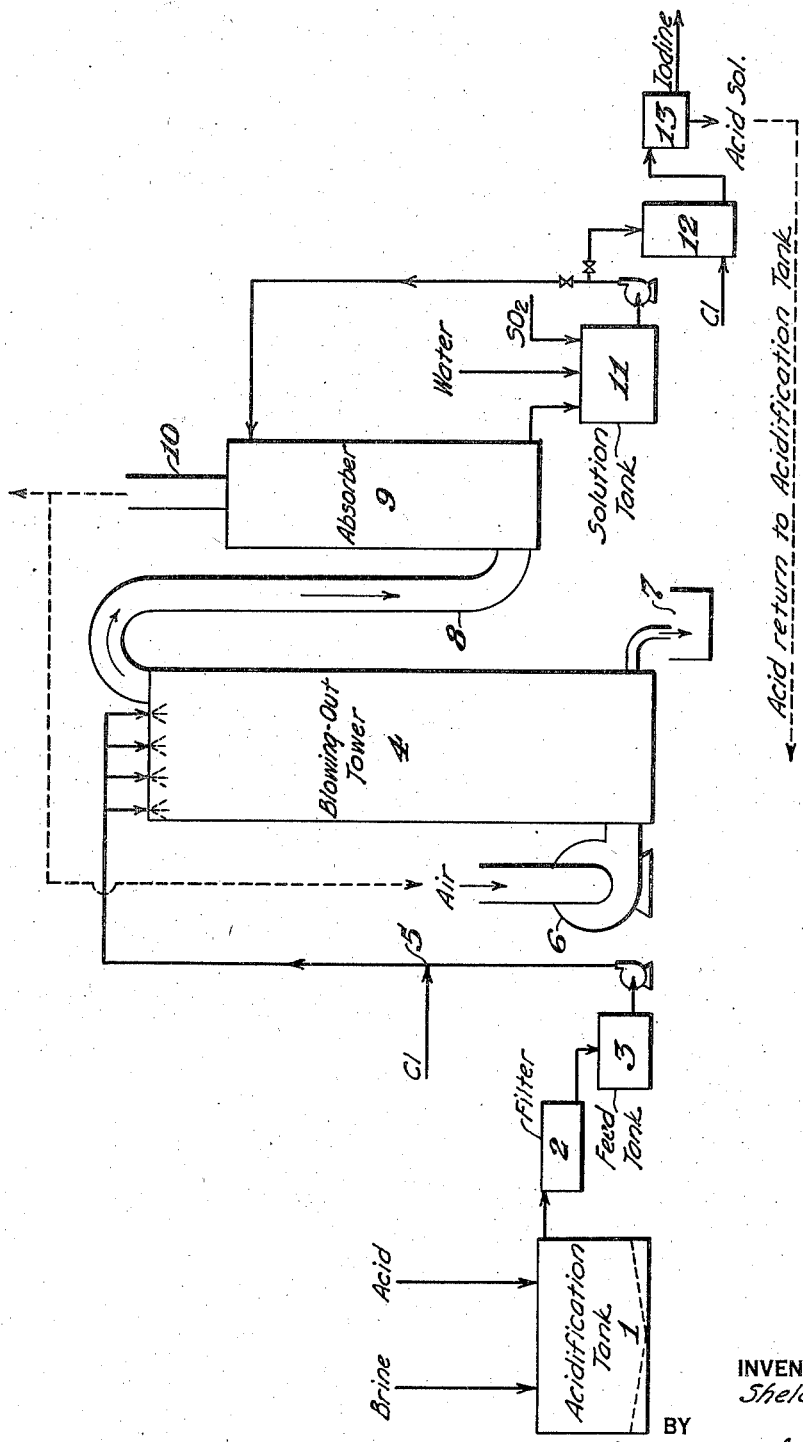

PROCESS OF PRODUCING IODINE

Sheldon B. Heath, Midland, Mich., assignor to The Dow Chemical Company, Midland, Mich., a corporation of Michigan Application May 13, 1936, Serial No. 79,455

7 Claims. (Cl. 23—217)

The invention relates to processes for producing iodine from solutions containing the same in combined form as iodide, such as natural iodiferous brines and the like.

Commercial processes for the manufacture of iodine ordinarily utilize natural salines as a source of supply, such as waste brines from oil fields, the proportion of iodine contained in which is extremely small, usually on the order of from 40 to 70 parts per million. A well known method of extracting iodine from such natural waters is known as the "blowing-out" process. Such process in general consists in oxidizing the acidified brine, by chlorinating, electrolyzing or otherwise, to liberate the free iodine therein, vaporizing and blowing out the liberated iodine by passing a voluminous current of air through the oxidized brine and absorbing the vaporized iodine from the air stream by scrubbing with an alkali solution.

The foregoing method is subject to certain disadvantages which add to the cost of the extraction and limit the recovery of the iodine. For instance, in the absorption step by means of alkali material losses of unabsorbed iodine occur, so that the recovery in this step in practice has been at best considerably short of the theoretical. The alkali scrubbing solution employed must be relatively dilute, the alkali concentration being not over 5 per cent. Even under best conditions the alkali content of the solution can be reacted to not more than 60 to 70 per cent of the total, since with a higher degree of saturation a material vapor pressure of iodine is produced which leads to vaporization losses of iodine, which is carried away by the air stream. Very large contact surfaces are required in the absorption step, and relatively large volumes of scrubbing solution in comparison with the amount of iodine to be absorbed, thus imposing a substantial power cost on the process for pumping and recirculating the scrubbing liquor. Finally the finished scrubbing liquor has a very low iodine content, not more than about 2 to 5 per cent.

It is among the objects of the present invention to increase the recovery of iodine in a blowing-out process, as well as to reduce the cost of production. Another object is to provide a more effective absorbing agent to remove the iodine from the air stream. A further object is to enable the absorption of the iodine to be carried out in smaller and less costly apparatus, and at less expense. To the accomplishment of the foregoing and related ends, the invention, then, consists in the improved process hereinafter fully described in the annexed drawing and following specification, and particularly defined in the claims.

In said annexed drawing:—

The single figure is a diagrammatic representation of an arrangement of apparatus suitable for extracting iodine from a natural brine.

I have found that the disadvantages connected with the use of an alkaline absorbing agent in a blowing-out process for producing iodine can be largely avoided or overcome by employing an aqueous acid liquor to absorb iodine from the air stream, the constituents of which liquor are capable of dissolving the iodine and chemically reducing it to hydriodic acid. An aqueous hydriodic acid solution is used, to which sulphur dioxide is added. Sulphur dioxide or sulphurous acid reduces iodine to hydriodic acid according to the equation;

$$I_2 + SO_2 + 2H_2O \rightarrow 2HI + H_2SO_4,$$ 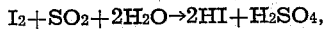

an equivalent amount of sulphuric acid being formed at the same time. Hydriodic acid is a good solvent for iodine, and the solution, up to an appreciable concentration of iodine, will not lose iodine by revaporization when exposed to a current of air, as in the absorption step of the aforesaid blowing-out process. The addition of sulphur dioxide to the hydriodic acid solution of iodine reduces the latter to form more hydriodic acid, restoring and in fact increasing its capacity to dissolve a further amount of iodine.

The action of the absorbing solution is, then, twofold in dissolving the iodine and reducing it to hydriodic acid. These two functions of the absorbing solution or liquor may be carried on simultaneously or consecutively, as desired, by suitable modification of the procedure followed in effecting the absorption of the iodine. Accordingly in one modification the iodine-laden air stream may be scrubbed with a solution of hydriodic acid, containing no sulphurous acid, and the solution of iodine thereby obtained can then be treated with sulphur dioxide to reduce such dissolved iodine. In another modification the scrubbing solution may contain both hydriodic acid and sulphurous acid, so that the iodine is dissolved and reduced simultaneously. When the absorption is carried out continuously with recirculation of the scrubbing liquor, the concentration of hydriodic acid therein steadily increases, while sulphurous acid is correspondingly consumed and must be replaced by further addition of sulphur dioxide. In the liquor a concentration of hydriodic acid of from about 10 to as high as 20 per cent may be obtained, which, in practice, will vary somewhat with the moisture content of the air stream, since water condensed therefrom in the absorption step causes some dilution of the liquor.

I have found that a scrubbing solution of hydriodic acid and sulphurous acid is much more effective to absorb iodine from the iodine-laden air stream than the alkaline solutions hitherto used, so that only a small fraction of the contact surface formerly used is now required to obtain an equal or better degree of absorption. Hence in the practice of the method of the invention smaller and less costly absorption apparatus may be used, and capital cost of plant and operating expense thereof is materially reduced.

In carrying out the invention the iodine-laden air stream is passed, either in countercurrent or parallel flow, through an absorber tower of usual construction which is filled with a suitable packing material, such as Raschig rings or other packing material, and the scrubbing solution of hydriodic acid and sulphuric acid, which may contain sulphurous acid or not, as the case may be, is circulated over the tower packing. In one embodiment the scrubbing solution contains sulphurous acid and is circulated at a rate preferably such that as it descends through the packing the sulphurous acid is completely reacted and an excess of the free halogen is dissolved in the solution when discharged at the bottom. Thereupon more sulphur dioxide is added to reduce such free halogen and provide a sufficient concentration of sulphurous acid, so that when the solution is recycled, it will be discharged again from the base of the tower with a slight color due to free halogen. Thus the control of the sulphur dioxide addition is very simple by visual observation of the color of the ingoing and outcoming solution from the absorption tower. However, it is not necessary to proceed in this way, since the absorber tower effluent may be permitted to have an unreacted excess of sulphurous acid, or the scrubber liquor may contain no sulphurous acid at all, sufficient sulphur dioxide being added thereto outside of the tower to reduce the iodine dissolved during passage through the tower. In any case the consumption of sulphur dioxide or sulphurous acid is about the same, only the situs of the reaction between it and the iodine, whether inside or outside of the absorber tower, being varied.

The efficiency of absorption of the iodine in any particular case is a function of the apparatus employed, depending upon the height and cross-section of the tower in proportion to the volume and velocity of air flow, as well as the type, size and surface area of the packing, and the rate of circulation of the absorbing agent, all of which is well understood by those skilled in the art. The method of the present invention, where a proper balance of the various design factors of the apparatus is obtained, permits an absorption of substantially 100 per cent of the iodine in the air stream, whereas under otherwise similar conditions an alkaline absorbent, e. g. 5 per cent sodium carbonate solution, would give only about 75 per cent absorption of the iodine. Furthermore, even by greatly increasing the size of apparatus and volume of absorber solution in proportion to air flow, it has not been found practically possible to recover as much as 95 per cent of the iodine in the air stream under conditions found in a blowing-out process, in which the iodine content of the air stream is normally on the order of one pound to from 30,000 to 50,000 cubic feet, or more, of air.

As a specific illustration of the practical application of the method of the invention I will describe the extraction of iodine from a waste oil field brine containing from 50 to 60 parts per million of iodine. Referring to the drawing, the brine, after clarification, if necessary, is introduced into an acidification tank 1, and a mineral acid, e. g. sulphuric, hydrochloric or sulphurous acid, etc., is added and mixed therewith, to acidify the brine to a pH value of about 2 to 3. Such oil field brine sometimes has a small barium content, which on treatment with sulphuric acid is gradually precipitated as barium sulphate, and settles out in the bottom of the tank, the inventory of the tank and baffling of the flow being such as to allow time for settling to take place. This separation of barium sulphate is important in order to prevent subsequent deposition of the same in the packing of the blowing-out tower, which might eventually cause clogging. The acidified brine overflows from tank 1, and passes through a filter 2, in which suspended matter is removed, and thence to a feed tank 3. From the feed tank the brine is pumped to the top of a blowing-out tower 4, chlorine being added at inlet 5 and mixed with the acid brine to liberate iodine therein. At the top of tower 4 the brine is fed through distributors into the tower, wherein it flows downwardly through the packing material in countercurrent to a large volume of air forced into the base of the tower by means of a blower 6. The air current vaporizes and carries away the free iodine in the brine, the waste brine effluent from the bottom of the tower running to a sewer 7.

The iodine-laden air stream passes from the top of the tower through a duct 8 to an absorber 9, which may also be filled with packing material, and in which the iodine is removed, while the stripped air is vented at stack 10. A water solution of sulphurous acid from tank 11 is pumped to the top of absorber 9, in which it flows in a distributed manner over the packing and is discharged at the bottom back into tank 11. The sulphurous acid in the solution reacts with the iodine in the air stream, converting it to hydriodic acid which dissolves in the solution, along with an equvalent amount of sulphuric acid simultaneously formed. The relative rates of flow in the absorber are preferably regulated so that the sulphurous acid introduced at the top is all reacted before the absorber solution reaches the bottom, the hydriodic acid formed dissolving some free iodine, so that the effluent from the base of the absorber is colored by the free iodine. However, it is not essential to operate in this way, as already explained above. In tank 11 sulphur dioxide is introduced in sufficient amount to reduce free iodine in the absorber effluent and produce the desired strength of sulphurous acid solution for recirculating. As the solution is continuously recirculated the concentration of hydriodic and sulphuric acids is built up therein. When a sufficient concentration is reached, e. g. 10 to 15 per cent HI, a portion of the solution is continuously bled off to a chlorinator 12, while sufficient water is added to tank 11 to maintain the volume of the solution, and hence an approximately constant concentration of acid in the absorber liquor. The acid solution diverted to chlorinator 12 is treated with chlorine to liberate free iodine, which precipitates as solid. The precipitate of iodine is separated in filter 13, and the product so obtained may be further purified in known manner. The filtrate, consisting of a solution of hydrochloric and sulphuric acids is returned to the acidification tank 1 to supply a portion of the acid required for treating the raw brine. Such filtrate may also contain a small amount of iodine, which can be recovered therefrom, if desired, by known methods, such as treatment with active charcoal; otherwise the iodine content is returned to the process along with the acid solution, thereby avoiding loss.

The waste air from stack 10 may, if desired, be recirculated in a closed system to the blowing-out tower, as indicated by the dotted line. This has some advantage in maintaining more nearly uniform temperature and humidity conditions in the system.

Under proper regulation and balance of air and solution flow in the absorption step it is practical to absorb from 98 to 100 per cent of the iodine in the air stream, the losses of iodine in the vent gases being negligible.

Various modifications of the procedure just described, as will be apparent to those skilled in the art, may be made without departing from the scope of the invention. The principal feature of novelty lies in the absorption of iodine from the air stream by contacting the latter with an aqueous scrubbing solution containing hydriodic acid to which sulphur dioxide is added in proportion approximately to the iodine absorbed. This method, as already shown, has the advantage over the known method of absorption of iodine by means of an alkali solution in numerous respects, including the following:—(1) the absorbing agent actually consumed, e. g. sulphur dioxide, can be completely reacted instead of only partially so, as when alkali is used; (2) there is a saving of materials in the elimination of the alkali, as well as of the additional acid required to neutralize the unreacted excess of alkali; (3) a much higher concentration of combined iodine can be obtained in the absorber liquor; (4) a considerably higher degree of removal of iodine from the air stream can be obtained; (5) such recovery can be had with a much smaller and more compact apparatus; and (6) the sulphuric acid produced along with the hydriodic acid in the absorption step, after separation of the iodine, can be used to acidify the brine entering the process.

In the blowing-out step any other gas inert to iodine may be used instead of air, such as carbon dioxide, nitrogen, combustion gases, etc., although in most cases air will be most economical. As regards the absorption step the general method herein described is applicable to absorb iodine vapors mixed with any different gas.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:—

1. The process of producing iodine from an iodide-containing solution, which comprises liberating the iodine in the solution, blowing it out with a current of air, intimately contacting the iodine-laden air stream with an acid scrubbing liquor containing hydriodic acid, while adding sulphur dioxide to such liquor to reduce the absorbed iodine, chlorinating the resulting solution of hydriodic and sulphuric acid to precipitate free iodine, and separating the latter.

2. The process of producing iodine from a natural brine, which comprises acidifying the brine, oxidizing to liberate iodine therein, blowing out the iodine with a current of air, scrubbing the iodine-laden air stream with an acid solution containing hydriodic acid, while adding sulphur dioxide thereto to reduce the absorbed iodine, chlorinating the resulting solution of hydriodic acid and sulphuric acid to precipitate free iodine, separating the iodine from the solution of sulphuric acid and hydrochloric acid thereby formed and returning the acid solution to the first step for acidifying the brine.

3. The process of producing iodine from a natural brine or the like, which comprises acidifying the brine, oxidizing to liberate iodine therein, blowing out the iodine with a current of air, scrubbing the iodine-laden air stream with an acid solution containing hydriodic acid and sulphurous acid, adding sulphur dioxide to the solution to replace the sulphurous acid previously removed by chemical reaction with the iodine and to react with any free iodine present therein, recirculating the solution for scrubbing the iodine-laden air until a substantial concentration of hydriodic acid is accumulated in the solution, chlorinating the resulting solution to precipitate free iodine therein, separating the iodine, and returning the residual solution of sulphuric acid and hydrochloric acid to the first step for acidifying the brine.

4. In a process for extracting iodine from a solution containing the iodine in combined form, the steps which consist in liberating the iodine in the solution by oxidation, vaporizing the liberated iodine by blowing out with a current of inert gas such as air, and removing such vaporized iodine from the gas stream by intimately contacting the latter with an aqueous acid solution containing hydriodic acid and sulphurous acid.

5. In a process for extracting iodine from a solution containing the iodine in combined form, the steps which consist in liberating the iodine in the solution by oxidation, vaporizing the liberated iodine by blowing out with a current of air, recovering iodine from the iodine-laden air stream by scrubbing the latter with an aqueous acid solution containing hydriodic acid and reducing the absorbed iodine to hydriodic acid by adding sulphur dioxide to the scrubbing solution.

6. In a process for extracting iodine from a solution containing the iodine in combined form, the steps which consist in liberating the iodine in the solution by oxidation, vaporizing the liberated iodine by blowing out with a current of air, recovering iodine from the iodine-laden air stream by scrubbing the latter with an aqueous solution containing hydriodic acid, adding sulphur dioxide to the scrubbing solution to reduce free iodine dissolved therein to hydriodic acid, and recirculating the solution in the scrubbing step.

7. In a process for extracting iodine from a solution containing the iodine in combined form, the steps which consist in liberating the iodine in the solution by oxidation, vaporizing the liberated iodine by blowing out with a current of air, recovering iodine from the iodine-laden air stream by scrubbing the latter with an aqueous solution containing hydriodic acid, adding sulphur dioxide to the scrubbing solution in excess of the amount required to reduce the free iodine dissolved therein to hydriodic acid, and recirculating the solution in the scrubbing step.

SHELDON B. HEATH.

CERTIFICATE OF CORRECTION.

Patent No. 2,143,222.                                             January 10, 1939.

SHELDON B. HEATH.

It is hereby certified that error appears in the printed specification of the above numbered patent requiring correction as follows: Page 2, second column, line 3, strike out the syllable "con-"; line 40, for "equvalent" read equivalent; page 3, first column, line 48, for the word "different" read indifferent; and that the said Letters Patent should be read with this correction therein that the same may conform to the record of the case in the Patent Office.

Signed and sealed this 14th day of March, A.D. 1939.

Henry Van Arsdale.

(Seal)                                           Acting Commissioner of Patents.